(12) United States Patent
Tate et al.

(10) Patent No.: US 6,577,650 B1
(45) Date of Patent: Jun. 10, 2003

(54) METHOD OF SETTING-UP AND CONTROLLING SYNCHRONIZATION WITHIN A MODEM

(75) Inventors: Christopher Neville Tate, Bishops Stortford (GB); Leslie Derek Humphrey, Harlow (GB); Roger James Williamson, Much Hadham (GB); Igor Kajetan Czajkowski, Bishop Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/364,132

(22) Filed: Jul. 30, 1999

(30) Foreign Application Priority Data

Aug. 28, 1998 (GB) .............................. 9818911

(51) Int. Cl.[7] .................................. H04J 3/06
(52) U.S. Cl. ...................... 370/509; 375/362
(58) Field of Search ................ 375/220, 221, 375/222; 370/352, 465, 503, 516, 280, 294

(56) References Cited

U.S. PATENT DOCUMENTS

| | | | | |
|---|---|---|---|---|
| 5,682,404 A | * | 10/1997 | Miller | 375/222 |
| 6,091,932 A | * | 7/2000 | Langlais | 455/5.1 |
| 6,148,006 A | * | 11/2000 | Dyke | 370/480 |
| 6,236,675 B1 | * | 5/2001 | Bedingfield | 375/222 |
| 6,301,308 B1 | * | 10/2001 | Rector | 375/270 |
| 6,353,628 B1 | * | 3/2002 | Wallace | 375/220 |
| 6,370,156 B2 | * | 4/2002 | Spruyt | 370/480 |

* cited by examiner

*Primary Examiner*—Ajit Patel
*Assistant Examiner*—Chirag Shah
(74) *Attorney, Agent, or Firm*—Barnes & Thornburg

(57) ABSTRACT

To facilitate acquisition of lock in a multiple sub-channel carrier scheme, a plurality of time-continuous pilots (102) on known sub-channels are made available to an addressed unit across the frequency spectrum. The addressed unit is then able to select one of these pilots for training purposes and specifically for frequency and phase acquisition (106). The selection is based, typically, on the pilot with either the best signal to noise ratio or the first pilot to satisfy the minimum quality requirements for effective training. Discontinuous carriers, of which there can be several, are then used to identify a symbol boundary at the addressed unit. Once acquisition has been established, the pilots can, if desired, be released to carry low-bit rate traffic, although it is preferable to retain pilot tones for use within the system. Selection of the pilot from one of a number of alternative sub-channels distributed through the spectrum therefore ensures accurate synchronisation irrespective of whether portions of the spectrum are generally noisy and unclean.

11 Claims, 4 Drawing Sheets

METHOD OF SETTING-UP AND CONTROLLING SYNCHRONIZATION WITHIN A MODEM

BACKGROUND TO THE INVENTION

This invention relates, in general, to a method of setting up and controlling synchronisation of a wireline modem, and is particularly, but not exclusively, applicable to the use of pilot tones in modems that support digital subscriber line (xDSL) communication protocols in bidirectional wireline systems.

SUMMARY OF THE PRIOR ART

Telecommunication systems that interconnect wireline subscriber terminals are being developed to support broadband data communication. More particularly, recent developments in broadband communication protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and High-speed Digital Subscriber Line (HDSL) protocols, for example, can support data rates of 2 Mbps over distances of approximately three kilometres, while more complex schemes (such as VDSL) can support data rates of 8 Mbps and above over distances of, typically, less than two kilometres. Protocols such as Very high-speed Digital Subscriber Line (VDSL) utilise multiple sub-channel carriers, e.g. in a discrete multi-tone (DMT) environment, to provide an adaptive system that mitigates the effects of cross-talk by selectively ignoring noise-effected sub-channel carriers or reducing the number of bits supported on each sub-channel. As will be appreciated, DMT provides a comb of frequency carriers that are each separated modulated and then combined to generate a composite signal envelope. As such, information (both control information and traffic) is distributed across a number of different frequency carriers.

DMT schemes for supporting VDSL are often realised in a time division duplex (TDD) transmission environment in which a single communication resource, i.e. a frequency band, supports both up-link and down-link transmissions using the same frequencies. In other words, there is a sharing in time of the bandwidth provided by the extended spectrum. The use of guard periods between adjacent groups of time-slots within a TDD frame ensures that rogue overlapping transmissions within the up-link and down-link do not occur, and hence eliminates the likelihood of near-end cross talk (NEXT). In more detail, the guard periods provide a period in which a power amplifier can power-up and power-down, and also allow for some adjustment (i.e. alignment) of the frame with respect to a selected pilot tone on a designated sub-channel carrier of a DMT scheme. NEXT is of particular concern because it occurs when electromagnetic interference is induced into a wireline resource that is communicating information in an opposing direction, e.g. down-link (or downstream) information appears as noise in an up-link (or upstream) path. NEXT is particularly undesirable because near-end generated interference is at a level that can potentially swamp data signals received from a remote terminal, which data signals have previously been subjected to attenuation through the transmission path. Furthermore, NEXT increases significantly the higher frequency components and so in even more undesirable in high frequency data-over-voice wireline systems, such as VDSL.

In order to establish effective end-to-end communication in a communication system, it is necessary for synchronisation between a transmitting unit and an interconnected receiving unit to occur; this is true for both a radio frequency environment and a wireline environment, such a VDSL system employed over a twisted pair. More specifically, synchronisation is required to demodulate encoded signals that are addressed to the receiver. In this respect and in relation to a DMT system (or the like, such as an orthogonal frequency division multiplexed OFDM scheme), a pilot carrier or tone is used in a training sequence on a dedicated (pre-allocated) sub-channel. Initially, upon receipt of the pilot tone, the receiver acquires frequency lock and then establishes phase lock.

At frequency and phase-lock, the equipment does not necessarily have symbol alignment in a TDD scheme and so it is necessary to communicate information in both directions to acquire full synchronisation between, say, line termination equipment (LTE) and customer premises equipment (CPE). For example, while the reception by the CPE of an initial transmission from the LTE can be used to align transmit and receive periods of a TDD frame in the CPE, the guard period between the transmit and receive periods at the LTE must be varied to take into account transmission delays in the communication resource. Therefore, the CPE must send some form of acknowledgement or signal back to the LTE in order that full synchronisation at both ends of the call is established. Even after full synchronisation has been achieved, conventional DMT modems then necessarily use the sinusoidal waveform of the pilot tone as the basis of a phase reference to enable a phase lock loop to correct for any variations in the operating frequency provided by a local crystal oscillator. Unfortunately, a consequence of this approach is that a carrier must be reserved for the pilot function and so channel (data traffic) capacity is therefore restricted.

Another concern in relation to the implementation of wide bandwidth applications (required multi-carrier schemes) arises from the fact that the frequency spectrum seldom provides a homogeneous transmission environment and usually exhibits significant variations in its signal to noise (S:N) ratio across its bandwidth. In fact, portions of the spectrum are often unusable as a consequence of the presence of interference, such as noise and intermodulation products. To avoid these poor spectral regions, modems associated with the transmitter and receiver negotiate for the best sub-channel carriers during training and reject those sub-channel carriers that have a performance below a predetermined and acceptable threshold. Unfortunately, however, since the unmodulated pilot tone on its dedicated sub-channel is fundamental in establishing and maintaining synchronisation, present systems must invariably fix this sub-channel and therefore inherently subject the pilot to noise and general interference problems that either preexist or arise during a call in the same spectral region as the pilots sub-channel. For example, the lines over which a modem will operate will be subject to many sources of noise, such as radio frequency interference, cross-talk and impulse noise. In addition, bridge taps on the loop can create notches in the transmission characteristics of the loop. Consequently, present systems of the prior art are occasionally unable to locate the pilot for training purposes and are therefore unable to establish a call. Additionally, prior art systems may loose the pilot during a call, which loss results in a loss of synchronisation and consequently both the inability to recover encoded information and the earlier termination of the call.

Clearly, it would be desirable for a multi-carrier system to have immunity to spectral variation, especially in relation to pilot tones.

SUMMARY OF THE INVENTION

According to a first aspect of the present invention there is provided a method of establishing synchronisation between a transmitting unit and an addressed unit over a communication resource supporting a multiplicity of sub-channel carriers, the method comprising the steps of: from the transmitting unit, sending a time-continuous pilot tone on each of a plurality of predetermined sub-channels; detecting at least one of the time-continuous pilot tones at the addressed unit and assessing a quality of the at least one time-continuous pilot tone; based on the quality, selecting a time-continuous pilot tone; and acquiring frequency and phase lock between the transmitting unit and the addressed unit using the selected time-continuous pilot tone.

In another aspect of the present invention there is provided a modem arranged to operate in a time division duplexed multi-carrier environment, the modem comprising: a controller for regulating the operation of the modem and a memory coupled to the controller and having a look-up table identifying a plurality of sub-channels on each of which a time-continuous pilot tone is initially transmitted; wherein the controller comprises: means for regulating transmission of the plurality of time-continuous pilot tones; means for assessing quality of incident time-continuous pilot tones; means for selecting a time-continuous pilot tone based on quality; and means for acquiring frequency and phase lock using the selected time-continuous pilot tone.

The present invention therefore advantageously provides a multi-carrier system that is generally more robust and specifically less susceptible to initial or time-varying spectral variation that effect sub-channels, especially those used in relation to a pilot tone for training and reference.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
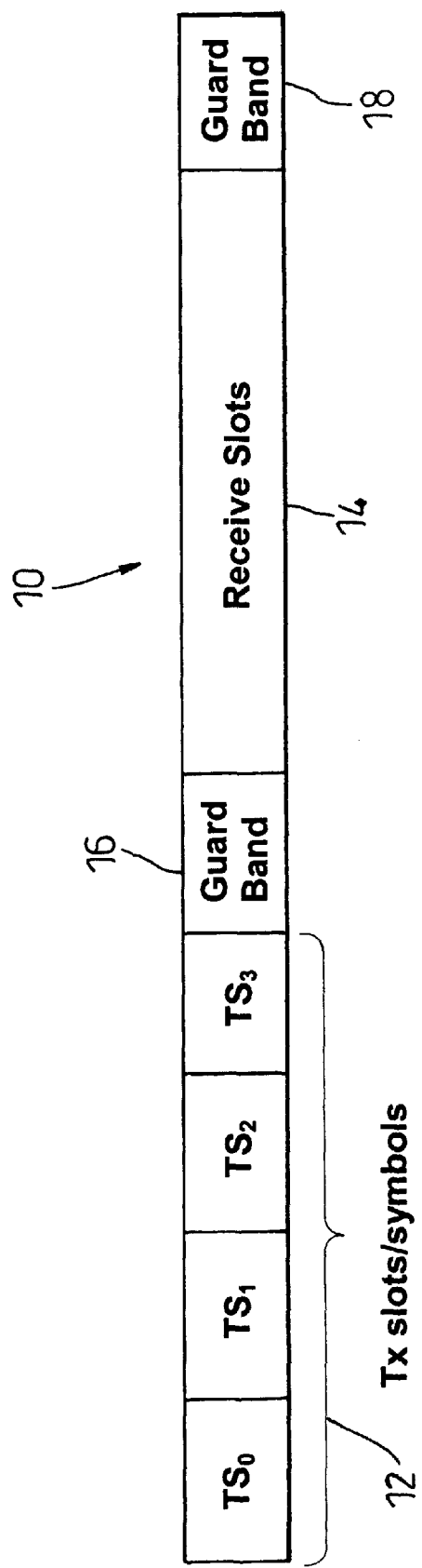
FIG. 1 is a representation of a time division duplex frame that supports the concepts of the present invention.

FIG. 1 is a representation of a time division duplex (TDD) frame 10 that supports the concepts of the present invention.

The TDD frame 10 has a transmission period 12 that precedes a reception period 14 and is therefore associated with terminal that has initiated a call. The TDD frame could be used in either of an up-link or a down-link, and for the sake of exemplary explanation will be considered to emanate from line termination equipment (LTE), such as an exchange. The transmission period 12 and reception period 14 are punctuated by guard periods 16–18 that each have a nominal duration of about half of a symbol, although this period is clearly variable. In relation to the time representation provided by the TDD frame 10, the transmission time slots $TS_0$–$TS_3$ contain different information, with $TS_0$ necessarily different to $TS_1$–$TS_3$; the reason for this will subsequently become clear.

Considering the scenario of a call set-up procedure from the LTE to the CPE (or "the addressed unit"), a number of sub-channel are initially used for pilot tones and associated control information. One set of sub-channel carriers are used as pilots and have a continuous time domain waveform, i.e. that there are no discontinuities in the pilot at symbol or time-slot boundaries, whereas others of the set of sub-channels (of which there can be an arbitrary number, but in the preferred embodiment number about four) are discontinuous. Selection of the time-continuous pilot frequency is complicated in view of the usual necessity for cyclic extension (either as a prefix or suffix) of a symbol, but will be appreciated by the skilled addressee. More specifically, a constant sinusoid is required in order effectively and quickly to establish frequency and phase lock at the addressed device or unit. It will be appreciated that discontinuities arise when the selected sinusoidal pilot has a frequency that is not an integer harmonic of a fundamental frequency.

Furthermore, it is generally desirable to utilise low frequencies for the pilots since lower frequencies are generally less susceptible to transmission losses, e.g. attenuation in a wireline, lower frequencies generally have a better signal to noise ratio, whereas higher frequencies have better phase error and the choice is a compromise.

The discontinuous carriers, once received at the addressed unit, aid in establishing symbol alignment since the discontinuities indicate TDD frame boundaries and hence allow synchronisation of the transmit and receive portions with respect to the time-continuous pilot. It is preferable that the discontinuous carrier tones are modulated because unmodulated tones exhibit a higher power spectral density (PSD). Also, modulation of the discontinuous carriers is beneficial since discrete tones are muted through being blending into a general background noise.

In a preferred embodiment of the present invention further uses an extended group (i.e. a set greater than one) of time-continuous pilots that have uncorrelated phases so as to avoid superposition of these time-continuous pilots and possible clipping at the addressed device, e.g. the CPE, and the transmitting device. Furthermore, the time-continuous pilots do not generally suffer from Fast-Fourier Transform (FFT) leakage. The extended group of pilots in general (i.e. both time-continuous and discontinuous carriers) is already known to those units that can be engaged in a call, with this knowledge pre-stored within the units. Therefore, during the training sequence, a sinusoidal waveform acting as pilot is transmitted on one or more of the pre-defined sub-channels or the pilot is transmitted in rotation through each of the pre-defined sub-channels for subsequent detection at the addressed unit.

In the preferred embodiment, the time-continuous pilots can be used independently of symbol alignment.

The preferred embodiment of the present invention is concerned with providing a more reliable and robust mechanism for maintaining clock synchronisation and proposes dynamic allocation of the pilot during training and preferably during subsequent traffic. The determination of whether a stipulated pilot is adequate for the purposes of synchronisation and maintenance of synchronisation can be based on a carrier-to-noise ratio within the sub-channel dedicated to support the pilot. Since the addressed unit (e.g. the CPE) potentially receives all time-continuous pilots, the CPE is able to make a relative comparison between received signal levels of the different time-continuous pilots and can then notify the result in a return transmission. In other words, the addressed DMT modem of the preferred embodiment has the ability to identify a pilot at an optimal frequency location for anticipated, optimal synchronisation, with this decision relayed back in the return transmission.

The addressed unit (e.g. the CPE) can either analyse the signal qualities of all the time-continuous pilots on a group basis (e.g. by way of sequential assessment) before a decision is made, or the analysis can be terminated when a suitably high quality pilot is identified.

Robust synchronisation, as indicated, requires a strong (high quality) pilot. As previously indicated, DMT has the ability to make best use of the available capacity by tailoring the sub-channels used for communication. Therefore, armed with the identity of the time-continuous pilot adjudged by the addressed unit as being suitable as a base synchronisation reference, the information transfer (i.e. the sending of bi-direction traffic) can be established.

In summary, the preferred embodiment allows the addressed unit to select the time-continuous pilot with the best carrier-to-noise ratio (or its equivalent) and then to notify the transmitting unit of its selection. The selected pilot may operate throughout the subsequent transmission, while the rejected time-continuous pilots can, if desired, be utilised for traffic. Therefore, there is an increased flexibility in the allocation of bandwidth for supporting the carriage of data, while the modem and the transmission scheme become more robust since the pilot is on a sub-channel that is (at least) initially immune to interference to the greatest extent. The addressed unit has no a priori information with respect to the sub-channel of the pilot to be used for the traffic portion of the call, although the system is aware of which sub-channels are suitable for use as pilots. The selected pilot cannot be used to carry data in one of the preferred embodiments.

Transmission of all (potential) time-continuous pilots through the associated sub-channels is only required during the training sequence and up to a point where the addressed unit can select and identify the particular pilot of highest quality back to the addressing unit.

In the event that sub-channel originally ear-marked as pilots are utilised for relaying data during a call, it is preferable that the number of bits on such sub-channels is limited. Therefore, should synchronisation be lost during an ongoing call then the receiver can lock to any carrier and preferably to one of the sub-channels originally ear-marked as a pilot carrier. More particularly, with a low bit rate, phase acquisition can still be relatively easily attained through rotation of the symbol constellation at, typically, the addressed unit (as will be readily appreciated), while higher rates introduce greater numbers of possible points and an increased likelihood that phase lock will be incorrect and data recovery incarcerate. It is most desirable to maintain pilot tone transmission on all ear-marked pilot sub-channels (should bandwidth permit).

By removing the requirement for a pilot during data transmission, a carrier formerly used for synchronisation during training can now be freed up to carry data thus increasing the capacity of the communication resource. Furthermore, using more than one carrier for synchronisation adds redundancy and resilience in the event of intermittent interference affecting one or more of the pilots. This aspect of the present invention can be considered to provide a pilotless clock maintenance algorithm. In other words, phase errors are used to update the phase locked loop (PLL) controlling the sample clock of the analog-to-digital converter of the DMT receiver, whereby rotation of the constellation caused by drifting in alignment is corrected.

The second aspect of the present invention therefore increases the channel capacity, eliminates high PSD associated with constant phase pilots and improves flexibility of the DMT modem by allowing spectrally agile clock algorithms to be employed without TX/RX signalling and negotiation.

In summary, the DMT scheme of the preferred embodiment initially has a set of potential pilot carriers and, in contrast with the prior art techniques, does not use a single predetermined pilot for frequency and phase locking during training and the subsequent traffic call. The addressed unit, in fact, selects the pilot and indicates its choice to the addressing unit at the other end of the communication link. Should the initially selected pilot falter in terms of its signal to noise ratio during subsequent communication then the remaining pool of pilots within the original set can be interrogated to determine whether their reception characteristics are better than those of the presently selected pilot and, in the event that they are, a change to a different part of the spectrum supporting a different pilot can occur.

Figure 2:
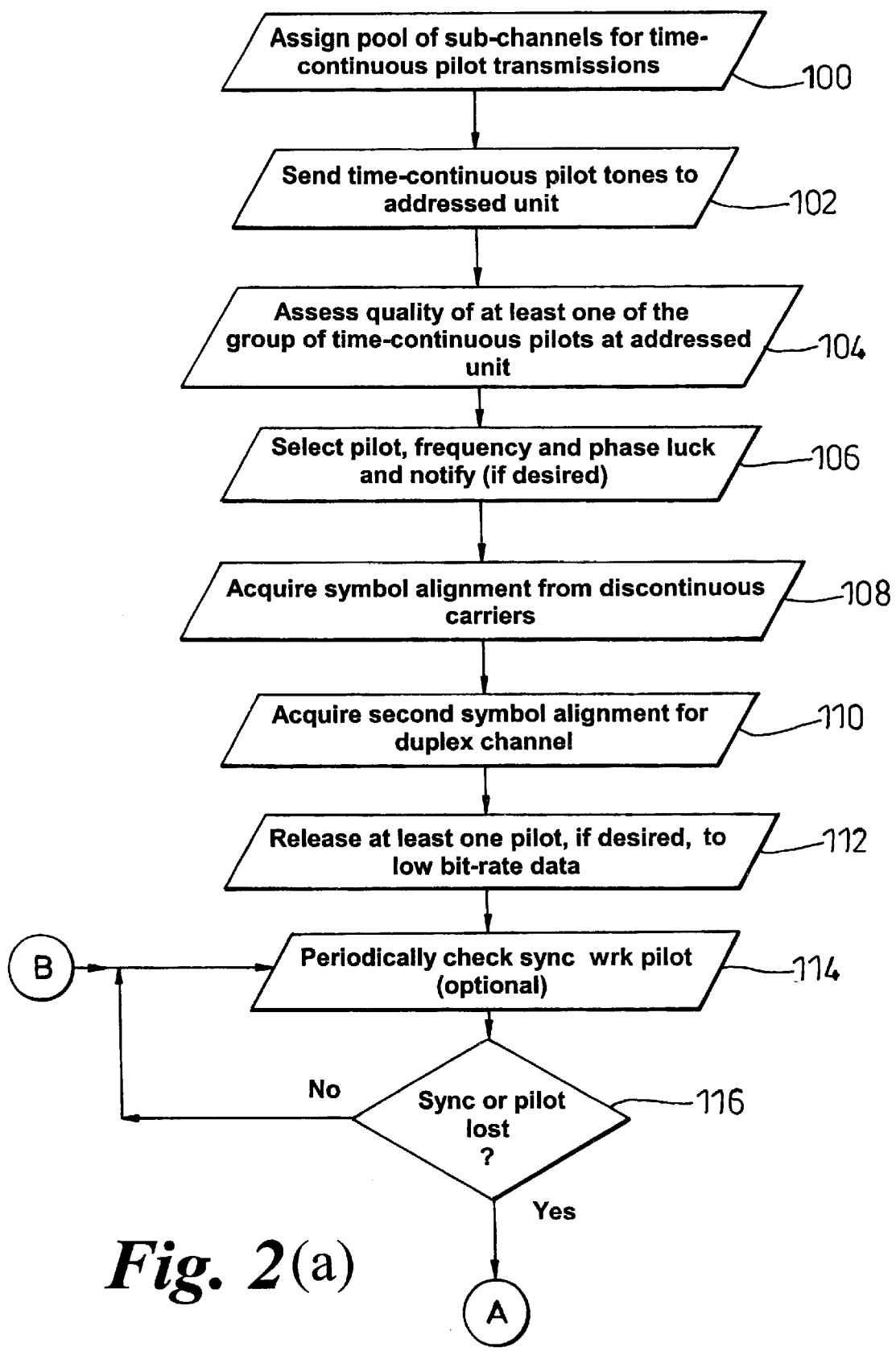
FIG. 2 is a flow diagram of a preferred operating mechanism of the present invention, and particularly illustrates the preferred method of selecting a sub-channel for use as a pilot in a DMT environment and maintaining the availability of that pilot during a call.
Figure 2:
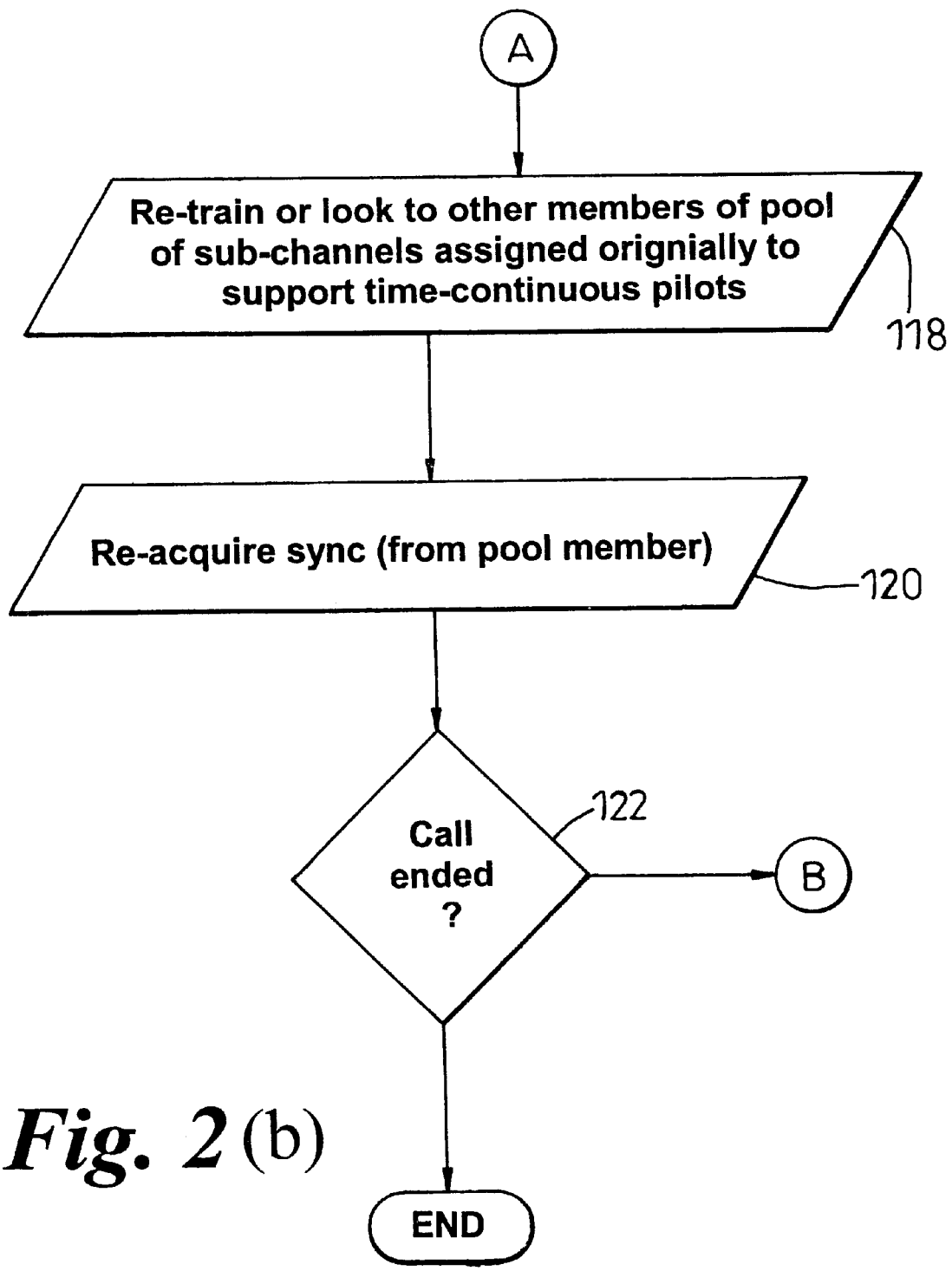

Referring to FIG. 2, there is shown the process flow of the preferred embodiment. Initially the system assigns 100 a pool of sub-channels for time-continuous pilot transmissions. The time continuous pilot tones are then sent 102 to an addressed unit that assesses the quality 104 of at least one of the group of time-continuous pilots. The addressed unit selects a pilot and then acquires frequency and phase lock (106). If desired the addressed unit notifies by return the selected pilot. Symbol alignment is acquired 108 from incident discontinuous carriers. For full duplex communication, symbol alignment is then also acquired at the transmitter 110. If desired, at least one of the pilots can be released 112 for low bit-rate data. Periodically, there may be a requirement to check synchronisation with respect to the selected pilot 114, although this is optional. At some point, there is usually a check to ascertain whether synchronisation or the pilot have been lost 116. If either one of synchronisation or the pilot has been lost then the process requires re-training (from step 102 onwards) or the system looks to other members of the pool of sub-channels to acquire a different time-continuous pilot 118. Conversely, if the pilot and synchronisation are still available then the system will generally loop round to an appropriate point in the process, such as block 114 or decision block 122 (to be described subsequently). Re-acquisition of synchronisation information is acquired at 120. Typically, the process will also require a call termination query 122 which will result in either the end of the process or the continued operation within the traffic mode.

Figure 3:
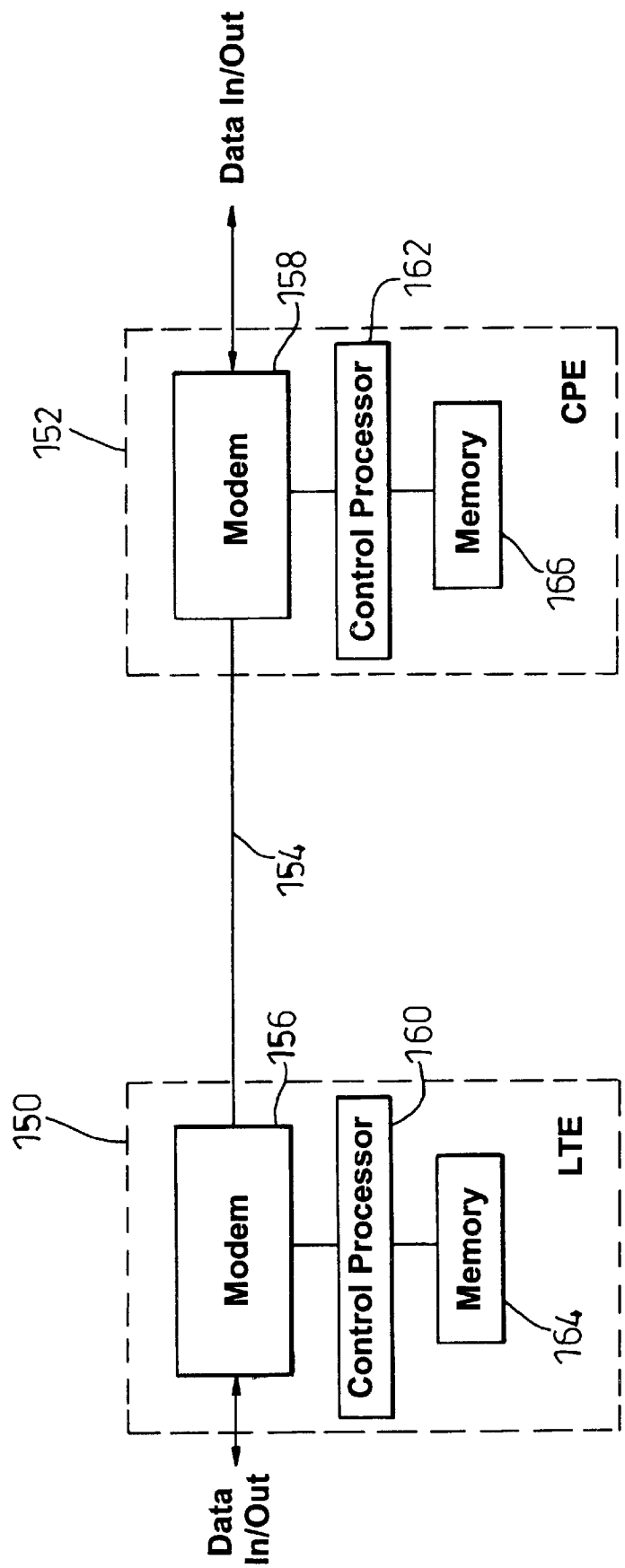
FIG. 3; is a block diagram of a communication system that can employ the operating mechanism of FIG. 2.

FIG. 3 shows a basic system architecture that supports the concept of the preferred embodiment of the present invention. For the sake of explanation, the system will be described in relation to a wireline (twisted pair) system having line termination equipment (LTE) 150 coupled to customer premises equipment (CPE) 152 through a communication resource 154. The basic structures of the LTE 150 and CPE 152 (in relation to the present invention) are identical. Specifically, each unit contains a modem 156–158 that is coupled to the communication resource and which modem 156–158 is responsive to data. The modem is under the operational control of a control processor 160–162 that is also coupled to a memory 164–166. The memory 164–166 contains a look-up table identifying the pool of sub-channels that are used as pilots and also, although this is optional, those sub-channels used as discontinuous carriers. During operation, the control processor regulates the modulation and de-modulation of data and controls the operation of the communication device generally. The control processor 160–162 also accesses the memory in order to obtain information pertaining to pilots and discontinuous carriers used during training and traffic: this has been described above.

It will, of course, be appreciated that the above description has been given by way of example only and that modification in detail may be made within the scope of the present invention. For example, whilst the preferred embodiment has been described in relation to a wireline system, it will be appreciated that the general concept of initially using multiple pilots is equally applicable to other environments and techniques, such as radio frequency OFDM.

What is claimed is:

1. A method of establishing synchronisation between a transmitting unit and an addressed unit over a communication resource supporting a multiplicity of sub-channel carriers, the method comprising the steps of:
   from the transmitting unit, sending a time-continuous pilot tone on each of a plurality of predetermined sub-channels;
   detecting at least one of the time-continuous pilot tones at the addressed unit and assessing a quality of the at least one time-continuous pilot tone;
   based on the quality, selecting a time-continuous pilot tone from the time-continuous pilot tones; and
   acquiring frequency and phase lock between the transmitting unit and the addressed unit using the selected time-continuous pilot tone.

2. The method of establishing synchronisation according to claim 1, wherein the communication resource supports time division duplex (TTD) frames and the method further comprises the steps of:
   from the transmitting unit, sending at least one discontinuous carrier over the communication resource;
   receiving the at least one discontinuous carrier at the addressed unit;
   at the addressed unit, acquiring symbol alignment with respect to the TDD frames using the at least one received discontinuous carrier to identify symbol boundaries within the TDD frames.

3. The method of establishing synchronisation according to claim 1, further comprising the steps of:
   transmitting a symbol aligned time division duplex frame to the transmitting unit; and
   in response to receipt of the symbol aligned time division duplex frame, acquiring symbol alignment at the transmitting unit by varying a guard period between transmission and reception periods.

4. The method of establishing synchronisation according to claim 1, wherein the discontinuous carrier is modulated.

5. The method of establishing synchronisation according to claim 1, further comprising the steps of:
   after acquiring frequency and phase lock, releasing at least one of the plurality of predetermined sub-channels initially assigned to support a time-continuous pilot tone and
   applying low bit-rate traffic to those predetermined sub-channels that have been released.

6. The method of establishing synchronisation according to claim 1, further comprising the steps of:
   sequentially detecting each of the time-continuous tones on each of the plurality of predetermined sub-channels; and
   assessing a quality of each of the time-continuous tones.

7. The method of establishing synchronisation according to claim 1, wherein the plurality of pilot tones are differentiated in phase and frequency.

8. The method of establishing synchronisation according to claim 1, further comprising the steps of:
   periodically assessing at least one of quality of the selected pilot tone and presence thereof; and
   in the event that the quality associated with the originally selected pilot tone has diminished beyond a predetermined threshold, selecting a sub-channel carrier associated initially with a different pilot tone.

9. The method of establishing synchronisation according to claim 8, further comprising the step of:
   re-acquiring synchronisation from the sub-channel carrier associated initially with the different pilot tone.

10. The method of establishing synchronisation according to claim 1, wherein the communication resource is a wireline and preferably a twisted pair.

11. A modem arranged to operate in a time division duplexed multi-carrier environment, the modem comprising:
    a controller for regulating the operation of the modem; and
    a memory coupled to the controller and having a look-up table identifying a plurality of sub-channels on each of which a time-continuous pilot tone is initially transmitted;
    wherein the controller comprises:
        means for regulating transmission of the plurality of time-continuous pilot tones;
        means for assessing quality of incident time-continuous pilot tones;
        means for selecting a time-continuous pilot tone from the time-continuous pilot tones based on quality; and
        means for acquiring frequency and phase lock using the selected time-continuous pilot tone.

* * * * *